July 28, 1959

R. ADELL 2,896,998

AUTOMOBILE DOOR EDGE MOLDING AND
METHOD OF APPLYING THE SAME

Filed Jan. 3, 1955

INVENTOR.
ROBERT ADELL
BY Gregory S. Dolgorukov
ATTORNEY.

July 28, 1959　　　　　R. ADELL　　　　　2,896,998
AUTOMOBILE DOOR EDGE MOLDING AND
METHOD OF APPLYING THE SAME
Filed Jan. 3, 1955　　　　　　　　　　　2 Sheets-Sheet 2

INVENTOR.
ROBERT ADELL
BY Gregory J. Dolgorukov
ATTORNEY.

United States Patent Office 2,896,998
Patented July 28, 1959

2,896,998

AUTOMOBILE DOOR EDGE MOLDING AND METHOD OF APPLYING THE SAME

Robert Adell, Detroit, Mich., assignor to Franklin Z. Adell and Marvin M. Adell, both of Detroit, Mich.

Application January 3, 1955, Serial No. 479,380

1 Claim. (Cl. 296—44)

This invention relates to motor vehicles and more particularly to improved bodies thereof in which edges of various movable closures are provided with ornamental and protective molding.

While advantages of providing ornamental and edge protective molding such as are disclosed by my issued patents and pending applications have now been fully appreciated by those skilled in the art, provision of such molding presents a number of very difficult problems for some of which no adequate solution has yet been found, in spite of numerous attempts and a great variety of expedients proposed. One of such problems is confronted in shaping or bending the strip, from which molding is made, to the longitudinal curvature of the edge to which it is to be applied. Such bending or shaping is particularly difficult when the longitudinal curvature of the edge to which the molding is to be applied is of the three dimensional nature, i.e., when the strip is to be bent not only transversely but also in the plane passing throught the axis of its U-shaped cross section parallel to the legs of the U. Such bending or shaping has to be done with the aid of relatively expensive apparatus, and it includes steps difficult to carry out and susceptible of producing considerable amount of scrap due to the formation of folds on the strip or distortion of its cross section.

As a result thereof it has been considered generally impracticable to supply such ornamental and edge protective molding in cases where demand for a molding of a particular dimensional and curvilinear specification is small or uncertain, such as may be the case with automobile doors and other closures of automobiles of models several years old. As a result, while such ornamental and edge protective moldings are now available for virtually all current models of automobiles made in this country, such moldings are not available for a large number of cars made a year or more ago.

One of the objects of the present invention is to provide an improved ornamental and edge protective molding for edges of closures of automobiles, whereby the above difficulties and disadvantages are overcome and largely eliminated.

Another object of the present invention is to provide an improved ornamental and edge protective molding having construction whereby such molding may be bent to any desired curvilinear curvature, including that of three dimensional nature, in a very inexpensive and simple manner, thus, making it practical to supply such moldings at reasonable prices for virtually any make of automobile and in any desired quantity.

A further object of the present invention is to provide an improved ornamental and edge protective molding of the foregoing nature, the appearance of which, and particularly the smooth or shiny surfaces thereof, is not affected by the nature of its construction or application.

A still further object of the present invention is to provide an improved ornamental and protective molding which can be applied to edges of automobile closures, particularly doors and trunk lids, in a simple and easy manner and by labor of limited skill, or even by automobile owners themselves.

A still further object of the present invention is to provide an improved method of making and applying ornamental and edge protective moldings for edges of automobile closures, particularly doors and trunk lids or covers.

It is an added object of the present invention to provide an ornamental and protective molding of the above nature, which is simple in construction, dependable in use, and is relatively inexpensive to manufacture.

Further objects and advantages of this invention will be apparent from the following description and appended claim, reference being had to the accompanying drawings forming a part of this specification, wherein like reference characters designate corresponding parts in the several views.

Figure 1:
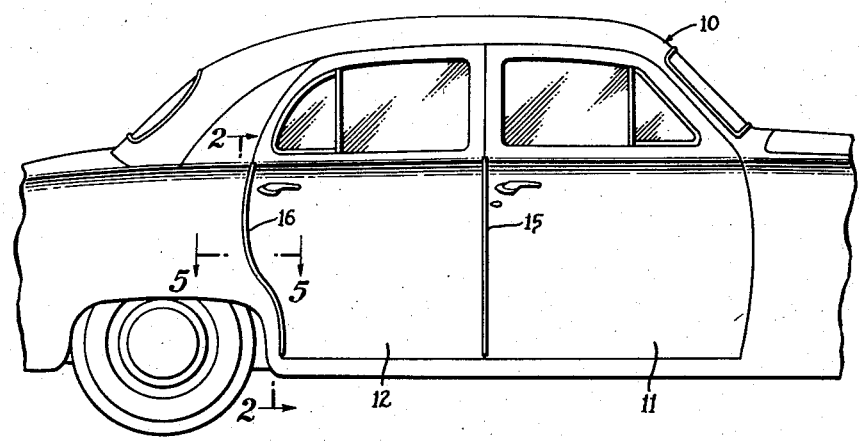
Fig. 1 is an elevational view of an automobile provided on the trailing edges of its doors with ornamental and edge protective moldings embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I discard the former practice of bending the molding to its final shape at the factory and supplying it to automobile dealers or owners in such final shape. I also completely discard recessing or notching the sides of the molding to a zig-zag or similar construction. In accordance with the invention I manufacture ornamental and protective molding from a relatively soft sheet metal, distortable without any appreciable spring back into any practical shape that can be found on edges of automobile closures. It is desired to select for such molding a metal of such character that it would take and retain plating without causing the same to peel off in the process of bending. I have found that soft brass, soft copper, soft aluminum, and a number of zinc or lead alloys give good results, since they take plating and have no tendency to spring back after distortion. The molding can be supplied to the dealer either in certain standard lengths, such as four or five feet, or can be pre-cut to specified lengths for application to particular edges. For lack of a better term, the molding of this nature is referred to as "distortable by hand without springback." Moldings made of sheet metal such as lead, tin, soft brass and aluminum as well as of alloys of such metals are within the purport of such definition. However, such definition does not apply to such metals as steel, hard brass and hard aluminum. It shall also be understood that such term does not mean that the molding must be applied with the aid of bare hands since hand tools such as illustrated may be used.

In application, the molding may be applied either directly to the edge or over the clips which are provided over such edge. The clips are provided with retaining teeth capable of embedding themselves in the metal of the molding to prevent slipping off of the same from the edge. Provision of clips has the advantage of permitting the water to drain and air to circulate over the molding thus preserving the paint finish of the edge. For removal, the molding is removed together with clips. Bending of the straight strip is done in the process of applying it to the respective edge, which may be done either solely by hand or with the aid of rubber mallet or with the aid of tools such as illustrated in the drawing.

Figure 6:
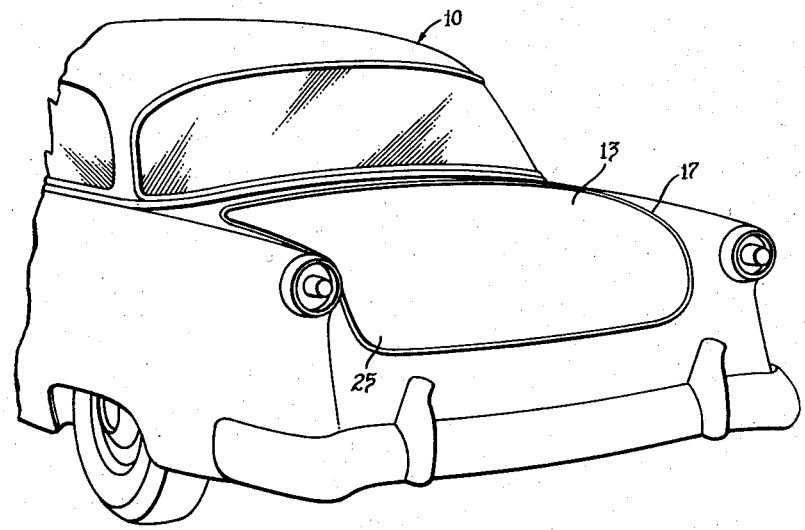
Fig. 6 is a perspective view of the rear end of the automobile of Fig. 1, showing its trunk lid provided with ornamental and edge protective molding embodying the present invention.

Referring to the drawings, there is shown therein an automobile having closures with three dimensional curvilinear edges and provided with edge protective and ornamental molding embodying the present invention. The automobile is generally designated by the numeral 10 and is shown in Fig. 1 in side elevation to show advantageously the front and the rear doors thereof designated generally by the numerals 11 and 12, respectively. Fig. 6 shows the rear end of the automobile with its trunk lid 13 and also including three dimensional curvilinear edges, and provided with a molding 17 along such edges.

The molding 15 provided along the trailing edge of the door 11 has curvature of two dimensional nature. In other words, while molding 15 appears straight in Fig. 1, it would appear curved in an end view such as Fig. 2. The molding 16 provided on the trailing edge of the door 12 appears curved in both Figs. 1 and 2 and, therefore, it has curvature of a three dimensional nature. The edge of the trunk lid 12 also has curvature of three dimensional nature. It will be understood that bending of molding to three dimensional curvature presents particular difficulties, and therefore, the present invention has a particular reference and advantage in application to such moldings which are exemplified in the present embodiment of the invention by moldings 16 and 17. It will be understood, however, that the invention is applicable with equal success to moldings such as 15, which have curvature of two dimensional nature.

Figures 2, 3, 5:
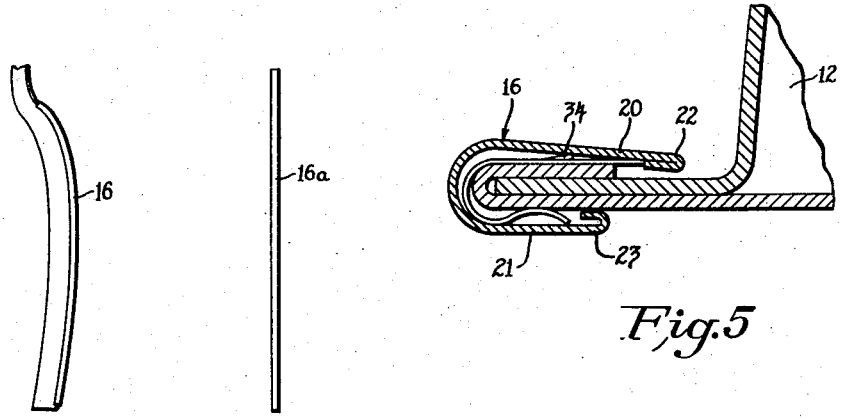
Fig. 2 is a fragmentary end view taken in the direction of the arrows on the rear edge of the rear door of the automobile of Fig. 1, in order to show the side curvature of said edge, as well as of the molding provided thereon.
Fig. 3 shows a piece of molding ready to be applied to the door.
Fig. 5 is a sectional view taken in the direction of the arrows on the section plane passing through line 5—5 of Fig. 1.
Figures 7, 8:
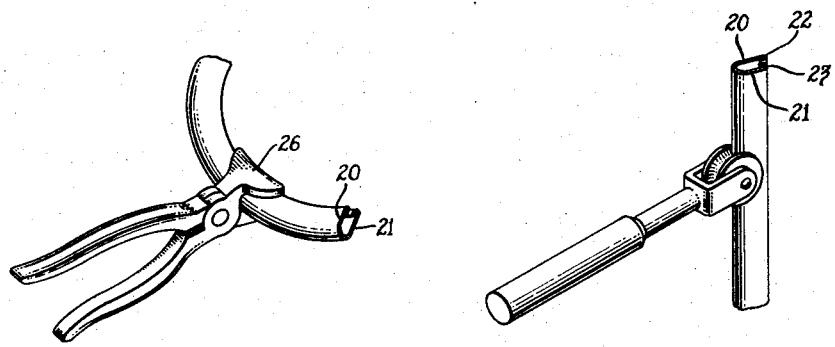
Figs. 7 and 8 show hand tools which may be used for applying my improved molding to various curvilinear edges.

In accordance with the invention, for providing molding for the three dimensional curvilinear trailing edge of the door 12, I provide a straight molding such as the one indicated in Fig. 3 by the numeral 16a. This molding is made of a strip of metal of the nature specified above and is bent to a U-shaped cross section, as is best shown in Fig. 5. The legs of the U need not be of uniform height and it is preferable to make the inner leg 20 of a somewhat greater height than the outer leg 21. The longitudinal edges of the legs 20 and 21 are bent upon themselves inwardly of the molding as shown at 22 and 23. It will be noted, however, that while the longitudinal edge 22 of the inner leg 20 is compressed to bring its inner surfaces into contact, the bend 23 along the edge of the leg 21 is bent on a predetermined curvature such as $1/64''-1/32''$ radius. I have found that by virtue of such an expedient collapsing of the leg 21 is virtually eliminated, and bending of the molding to its longitudinal curvature is greatly facilitate and can be accomplished without distortion of the U cross section of the molding. The molding when supplied to the trade may have the legs of the U closed more than what is shown in Fig. 5 where the molding is shown already applied to the edge of the closure. Thus, when the molding is applied to the edge, it is slightly spread by the edge as it is being pushed thereon. Application of the molding to the edge may be made by hand, and in such case it consists merely of applying the open side of the U against the edge and pushing the molding on the edge either by hand or with the aid of a rubber mallet. A roller tool such as shown in Fig. 8 may also be used. In going around the bends with relatively sharp curvature such as corner 25 of the trunk lid 13, a tool such as shown in Fig. 7 may be used to prevent the molding from opening up in some places. Such tool is provided with curvilinear lips 26 adapted to constrain the molding. Such tool may also be used after the molding is installed to go over the entire length thereof and to squeeze the molding and to lock it more securely to the edge of the automobile closure.

Figure 4:
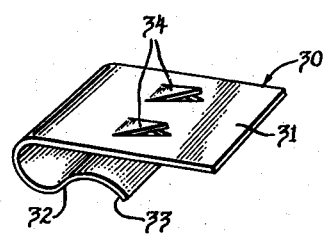
Fig. 4 shows one of the toothed clips which may be used in connection with my improved molding.

The molding embodying the present invention may be applied either directly to the edge, i.e., over the paint finish thereof, or over clips such as shown in Fig. 4. Such clips, one of which is shown separately in Fig. 4 and is generally designated therein by the numeral 30, are made of relatively thin sheet metal preferably material known in the trade as semi-hard. Such metal possesses certain amount of resiliency and yet it has sufficient softness to be susceptible of bending, collapsing or distorting by finger pressure. The clips are bent to a generally U-shape with their inner leg 31 being longer than the outer leg 32, with the edge of said leg being turned outwardly as indicated at 33 to facilitate slipping of the clip over the edge and to prevent damage to the paint finish on the outside of the door in application of the clip. No such precaution is necessary on the inner side of the door edge, and, therefore, the edge of the leg 31 may be left straight.

The width of the leg 32 is substantially less than that of the outer leg 21 of the molding 16, in order to ensure that it may be fully covered on the outside of the door by the molding. The inner leg 31 of the clip is preferably made shorter than the inner leg 20 of the molding and is provided with retaining teeth 34. For application of the molding, a number of clips 30 are first applied to the closure edge, with said clips being arranged substantially equidistant over the edge intended to be covered by the molding. On sharper portions of curvature, additional clips may be provided. The clips are first tried on the edge, and if they do not remain tightly thereon, they are squeezed or compressed by fingers until they are bent to a degree ensuring that they will remain on the edge when slipped thereon.

With the clips 20 being in place, the molding 16 is then applied to the edge over the clips in a manner explained above.

It will now be seen in view of the forgoing that with the teeth 34 having certain amount of resiliency, they will come in contact with the inner surface of the leg 20 of the molding, and any movement of the molding in the direction to slip off from the edge, will cause said teeth to dig into the soft metal of the molding 16 and to retain the molding in place.

Application of the molding 17 to the trunk lid 13 is substantially similar to that described above, except that the molding 17 may be in a plurality of pieces.

By virtue of the above disclosed construction and method, the objects of the invention disclosed above and numerous additional advantages are attained.

I claim:

In an automobile body having a door with a trailing edge, a plurality of spring steel clips provided on said edges, each of said clips being bent to a generally U-shaped cross section to provide an inner leg and an outer leg and a rounded connecting portion, at least one retaining tooth provided on the inner leg of each clip and pointing away from said rounded portion, said clips embracing the trailing edge and exerting resilient pressure thereon for retaining themselves in place on the edge, an ornamental and edge protective molding originally comprising a straight strip having a U-shaped cross section and made of relatively soft sheet metal adapting said strip to be bent beyond its elastic limit by hand and to retain the form so imparted to it without appreciable spring-back, said piece being fitted over said clips to cover said trailing edge and bent in the process of such fitting to the longitudinal curvature corresponding to that of the trailing edge.

References Cited in the file of this patent

UNITED STATES PATENTS

| | | |
|---|---|---|
| 543,777 | Niles | July 30, 1895 |
| 1,553,913 | Regenstein | Sept. 15, 1925 |
| 2,216,219 | Wiley | Oct. 1, 1940 |
| 2,226,615 | Killen | Dec. 31, 1940 |
| 2,319,723 | Crowe | May 18, 1943 |
| 2,646,617 | Turoff | July 28, 1953 |
| 2,685,473 | Adell | Aug. 3, 1954 |
| 2,733,097 | Stevens | Jan. 31, 1956 |
| 2,856,230 | Adell | Oct. 14, 1958 |